United States Patent Office 3,513,128
Patented May 19, 1970

---

3,513,128
PROCESS FOR THE PRODUCTION OF THERMALLY STABLE POLYOXYMETHYLENES
Fritz Ulrich Herrmann, Offenbach, Germany, assignor to Chemische Werke Huls A.G., Marl, Germany
No Drawing. Filed July 27, 1967, Ser. No. 656,332
Claims priority, application Germany, July 27, 1966, C 39,725
Int. Cl. C08g 1/04
U.S. Cl. 260—67    3 Claims

ABSTRACT OF THE DISCLOSURE

Copolymerization of trioxane with cyclic ethers or cyclic acetals to produce thermally stable polyoxymethylenes, wherein the copolymerization mixture is copolymerized at 62–120° C. until turbidity or strong increase of viscosity is reached, and then is quenched at a temperature of −10 to +60° C., and preferably storing the polymerizate for 5–120 minutes at 30–120° C. before cooling the polymerizate and processing same.

---

This invention relates to a process for the production of thermally stable polyoxymethylenes and the copolymerization of trioxane with cyclic ethers and/or cyclic acetals in the presence of cation-active catalysts.

Polyoxymethylenes, being substantially unaffected by changes in ambient temperature and humidity, can be molded and extruded into a variety of useful applications, such as gears, cams, valves, etc. Such useful polyoxymethylene resins of high molecular weight can be produced either by the anionic polymerization of formaldehyde, or by the cationic polymerization of trioxane, the latter being the cyclic trimer of formaldehyde. The polyoxymethylenes, however, contain unstable terminal-positioned hemiformal groups and are degraded, under thermal stress, down to a low molecular weight by the so-called "unzipping effect" with the formation of monomeric formaldehyde.

Consequently, in order to convert polyoxymethylenes having terminal-positioned hemiformal groups into commercially usable synthetic materials, it is necessary to stabilize the end groups, for example, by esterification. Such terminally esterified polymers are, however, saponifiable in the presence of alkalis; in addition, if internal chain scission occurs in such polymers, for example, under the effect of increased temperatures, it is possible for the unzipping effect to proceed from such unprotected sites. This problem is also present for products having etherified terminal groups.

It is known that more effectively stabilized polyoxymethylenes are obtained when trioxane is copolymerized with suitable comonomers which lead to the formation of ether groupings in the polyoxymethylene chain, which groupings interrupt the degradation. Suitable comonomers are, for example, cyclic ethers, cyclic acetals, and cationically polymerizable vinyl compounds. To obtain a polymerizate of optimum stability, the unstable terminal groups of the copolymerizates are removed by hydrolysis after the polymerization, this purposeful unzipping reaction being conducted only up to the ether groupings. Even if, during processing, the molecule chain is thermally cleaved the fragments can be degraded only down to the next ether groups, whereby an improved stability is attained. Consequently, such copolyacetals, particularly copolymerizates having a high content of polyoxymethylene units and a high molecular weight, can be employed in various fields, inter alia for the production of injection-molded and extruded plastic articles, having particular application where elevated temperatures are encountered.

A major disadvantage, however, in the above-discussed copolymerization is the requirement of a special step to degrade the unstable copolymerizate terminal groups before the polymers are worked up. This additional and definitely expensive process step has the additional disadvantage that part of the desired polymerizate is lost, and the cleaved formaldehyde molecules can be recovered for the polymerization process only by means of still further additional process steps.

An object of this invention is to eliminate this unsatisfactory process step, thereby substantially improving the processes for the production of degradation-resistant polyoxymethylene copolymerizates.

Another object is to provide a novel copolymerization process and products produced thereby.

Upon further study of the specification and claims, other objects and advantages of the present invention will become apparent.

To attain the above objects, there is provided a process comprising the steps of (a) maintaining the polymerization mixture in the molten condition between 62 and 120° C., optionally under pressure, until clouding occurs but before termination of the polymerization; and then (b) quenching to −10 to +60° C. for 1 to 240 minutes. A preferred embodiment comprises the further steps of storing the polymerizate after quenching for 5 to 120 minutes at 30–120° C., and then cooling the polymerizate before processing the same in a conventional manner.

Suitable monomers for the copolymerization comprise (a) trioxane and (b) based on the number of mols of total monomers, 0.1–20, preferably 0.1–10, and particularly 1–5 molar percent of copolymerizable cyclic ethers and/or cyclic acetals. Suitable cyclic ethers are, for example, those having 2–10, preferably 2–4 carbon atoms and 1–2 oxygen atoms, specific embodiments including, but not being limited to ethylene oxide, propylene oxide, styrene oxide, 1,4-dioxane, oxacyclobutane, tetrahydrofuran, or tetrahydropyran, or the derivatives thereof; particularly satisfactory proved to be ethylene oxide. Suitable cyclic acetals are, for example, those having 3–11, preferably 3–5 carbon atoms and 2–3 oxygen atoms, specific embodiments including, but not being limited to 1,3-dioxolane, 1,3-dioxane, 1,3-dioxacycloheptane, 1,3,5-trioxacycloheptane, diethylene glycol formal, or neopentyl formal, the preferred species being 1,3-dioxolane and 1,3-dioxacycloheptane (1,3-dioxacycloheptane can also be named 1,3-dioxepane, being a 7-membered saturated heterocyclic having 2 hetero oxygen atoms).

Suitable cationic catalysts are described in the literature. Examples of same include, but are not limited to: Friedel-Crafts catalysts; complexes thereof with water or organic compounds wherein the donor atom is oxygen, sulfur, or nitrogen; non-oxidizing inorganic acids or complexes thereof with boron trifluoride; halogens; compounds of halogens with one another; or oxonium salts. For a more detailed discussion of such catalysts, reference is invited to J. Furukawa and T. Saegusa, Polymerization of Aldehydes and Oxides, Interscience Publishers, New York, London, Sydney, 1963, pp. 242–246.

In general, the preferred copolymerization catalyst is boron fluoride, particularly in its etherate form. This preferred catalyst, as well as other catalysts can be present in proportions of 0.0001 to 1.0, preferably 0.001 to 0.1% by weight, based on the total weight of the monomers.

The polymerization is initiated by melting the reaction mixture, creating a uniform distribution by thorough agitation, and after the catalyst has been added, maintaining this reaction mixture under agitation at a temperature of between 62 and 120° C. until the commencement of clouding can be observed. For this to occur, a period of about 0.05 to 120 minutes is required, depending upon the type and quantity of the comonomer and particularly the catalyst. In some cases, it is advisable to operate under pressure, for example, at a polymerizing temperature above the boiling point of trioxane of 114.5° C. or when employing gaseous comonomers.

The occurrence of clouding of the reaction mixture is caused by the formation of insoluble macromolecules; such clouding is readily discernible and represents the end of the incubation period. From this instant on, the oligomers are built up to polymers, i.e., the polymerziation proper commences. If the reaction mixture, after the occurrence of clouding, remains at the starting temperature the polymerization process is terminated, under optimum conditions, within 1 to 5 minutes. Thus, if the reaction mixture is not quenched substantially immediately after clouding occurs, the optimum results attainable by this invention are not achieved. The clouding phenomenon can be defined as the formation of the first solid particles. Aside from macroscopic visual examination for the observation of the clouding point, instrumentation can be used. For example, the percent transmission or intensity of a beam of light through the melt can be monitored by a photometer.

Although the clouding point is the simplest criterion for the beginning of the polymerization it should be mentioned, however, that quenching does not necessarily have to be performed at this very moment or shortly afterwards in order to find the effect described herein. Thus, in many cases crystallization of the initially formed polymers is strongly retarded especially when higher amounts of comonomers are used or when more than 3 mole percent of 1,3-dioxyacycloheptane is used as comonomer. It is therefore recommendable in those cases to quench the mixture before clouding occurs. Depending on reaction conditions, the exact time of quenching has to be determined in certain instances in order to obtain optimal effects concerning the increase of the molecular weights or improvement of the thermal stabilities of the polymers.

It is preferred to operate so that as soon as the onset of clouding is observed (i.e., when the incubation time has elapsed) the trioxane is made to crystallize by quenching the mixture to a temperature of between −10 and +60° C., inclusive, preferably 0 and 40° C. Whereas some advantages accrue if the reaction mixture is quenched at any time prior to complete polymerization, it is stressed that the quenching should be conducted as soon after the cloud point as technically feasible. In this connection, substantial advantages are obtained if the time between the cloud point and the quenching step is 0–180 seconds, preferably 0 to 20 seconds.

The simplest method to determine the optimal time of quenching is the cloud point as is mentioned above. In many cases, for instance, when trioxane is homopolymerized or when less than 3 mole percent of comonomers are used the cloud point is identical with the termination of the incubation. Sometimes, however, precipitation of the initially formed polymers is retarded for some inexplainable reasons. The start of the growth of the polymer chains, i.e., termination of the incubation period, can also be observed by an increase of the viscosity of the reaction mixture and it is recommendable to start quenching as soon as an increase of the viscosity is noticeably visible. The viscosity of the reaction mixture increases from 0.84 centipoises at 65° C. or 0.78 centipoises at 90° C. of the liquid trioxane or of the comonomer mixture (95 mole percent trioxane, 5 mole percent 1,3-dioxacyloheptane) to 20,000 to 30,000 centipoises during 10 sec. to 10 minutes after initiation. The time during which the increase of the viscosity takes place depends on the amount of initiator added. In order to obtain the results of the invention it is therefore necessary to start quenching when the viscosity increases up to 100,000 centipoises especially in the viscosity range from 10,000 to 60,000 centipoises.

It is to be noted that the polymerization is quenched from a temperature of 62–120° C. to −10 to 60° C.; however, it is desirable that the extent of quenching in every case be equal to a temperature decrease of at least 5°, preferably at least 10° C.

The effect of quenching concerning the increase of the molecular weights and the improvement of the thermal stabilities is the greater, the greater the temperature difference is.

The mixture is maintained at the quenching temperature until at least about 80% polymerization, preferably about 100%. For this purpose, a period of 3 to 120 minutes at the quench temperature is normally required, again depending upon the type and quantity of the catalyst, as well as of the comonomer. (The conversion can be determined empirically by measuring the yield after the working-up process.)

After the polymerization has been completed to 80 to 100%, a polymer is obtained having a somewhat higher yield and an improved stability as compared to a polymer produced by a conventional one-step polymerization process, i.e., without a quenching step.

According to a preferred embodiment of this invention, a further substantial and unexpected improvement is attained by an additional process step. For this purpose, the mass is stored for 5 to 120 minutes at a temperature of 30–120° C. The duration of this final storage period is dependent upon the temperature at which the mass is stored and the desired molecular weight. The higher the temperature selected within the above-mentioned limits, the shorter is the period of time required for increasing the stability. On the other hand, the molecular weight decreases with the length of the storage time. This fact affords the possibility of obtaining a desired molecular weight by selecting the appropriate times and temperatures, as mentioned in Table II. After the thermal treatment the mass is usually cooled down to room temperature or at lower temperatures and can be worked up as usual.

The process can be conducted in a batch, semi-continuous, or continuous manner. For this purpose, there are provided, for example, an initiation zone, a cooling zone, and a heating zone. It is possible to pump the reaction mixture continuously through the various stages of the plant, or according to French Pat. No. 1,410,636, the reaction mixture can be transported in a hose-type pipe of plastic through the various reaction stages. Other techniques known in the polymerization art can also be used.

After the last stage, the polymer is cooled, and then it is worked up in a conventional manner in order to remove the catalyst and, if necessary, the residual monomers, for example, by comminution, washing with water, cold and hot ammonium carbonate solutions, hot water, and then drying.

The thermal stability of the products obtained according to this invention is determined at 222° C. in a nitrogen stream, by heating 100 mg. of the polymerizate in a small tube having a length of 70 mm. and a diameter of 8 mm., in a closed cylindrical vessel having in its upper section a nitrogen inlet and outlet. After predetermined periods of time, the weight loss is measured. This test method reveals the unstable proportion of molecules due to unstable chain ends.

The viscosity data are determined by solutions of the polymer in dimethyl formamide at 135° C. and at a concentration of 0.25 g. per 100 ml. As a stabilizer, diphenylamine in a concentration of 1 g./100 ml. is added to the solution.

The results of these evaluations are expressed by the reduced viscosity, which is defined as follows:

$$\eta_{red} = \text{Reduced Viscosity} = \frac{\text{Specific Viscosity}}{C}$$

wherein C is the concentration of the dissolved substance in g./100 ml.

Without further elaboration, it is believed that one skilled in the art can, using the preceding description, utilize the present invention to its fullest extent. The following preferred specific embodiments are, therefore, to be construed as merely illustrative, and not limitative, of the remainder of the disclosure in any way whatsoever.

EXAMPLES 1 TO 4

Two process steps

At 75° C., 135 g. freshly distilled trioxane, having a water content of less than 30 p.p.m., are intimately mixed in a glass vessel with 5 mol percent of 1,3-dioxacycloheptane and 0.125 ml. of a 5% by weight solution of $BF_3$-diethyl etherate in benzene. The reaction mixture is then filled into a polyethylene bag having the dimensions of 10 x 25 cm.; and after the bag has been sealed by welding, the reaction mixture is introduced into a water bath having a controlled temperature of 70° C.

In Example 1, the sample, after termination of the incubation period which takes about 0.5 to 1 minutes, remains in the 70° C. water bath for about 3 minutes until hardened completely. This procedure represents the former state of the art.

In Examples 2 to 4, the samples in the sealed polyethylene bags are quenched to the temperatures listed in Table I, 10 seconds after the incubation period has ended, and are worked up after 20 minutes. In order to process the samples, they are comminuted to a particle size of 1 mm. and washed successively with cold water, a cold and then a hot ammonium carbonate solution (1%), using 30 minutes of stirring for each step. After boiling for one hour with an aqueous ammonium carbonate solution of the same concentration, the polymerizate is washed to neutral with hot water, and then dried overnight at 50° C. in a vacuum drying chamber. The results tabulated in Table I clearly show that the properties of the samples of Examples 2 to 4 are improved substantially, as compared to that of Example 1 showing the former state of the art.

TABLE I

| Example | Quenching temp. (° C.) | η Red | Thermal stability after 4 hours under $N_2$ at 222° C. (percent) | Percent yield |
| --- | --- | --- | --- | --- |
| 1 | | 1.07 | 76 | 80 |
| 2 | 50 | 1.23 | 81 | 83 |
| 3 | 30 | 1.50 | 84 | 88 |
| 4 | 0 | 1.63 | 89 | 86 |

EXAMPLES 5 to 17

Three process steps

In correspondence with Examples 1 to 4, 135 g. trioxane is polymerized with 5 mol percent of 1,3-dioxacycloheptane. Ten seconds after clouding is observed, the samples are quenched to 0° C., and held at that temperature for 15 minutes. The samples are then heated, as set forth in Table II, for varying periods of time to different temperatures.

TABLE II

| Example | Heating temp. (° C.) | Heating period (min.) | η Red | Thermal stability after 4 hours under $N_2$ at 222° C. (percent) | Percent Yield |
| --- | --- | --- | --- | --- | --- |
| 5 | Not heated | | 1.67 | 89 | 82 |
| 6 | 30 | 5 | 1.66 | 90 | 81 |
| 7 | 30 | 30 | 1.61 | 91 | 83 |
| 8 | 30 | 120 | 1.52 | 91 | 80 |
| 9 | 50 | 5 | 1.62 | 91 | 84 |
| 10 | 50 | 30 | 1.56 | 93 | 82 |
| 11 | 50 | 120 | 1.32 | 95 | 85 |
| 12 | 70 | 5 | 1.58 | 91 | 84 |
| 13 | 70 | 30 | 1.39 | 95 | 86 |
| 14 | 70 | 120 | 1.09 | 96 | 80 |
| 15 | 90 | 5 | 1.51 | 92 | 83 |
| 16 | 90 | 30 | 1.20 | 95 | 79 |
| 17 | 90 | 120 | 0.88 | 96 | 76 |

If, in place of the $BF_3$-diethyl etherate, tin tetrachloride or triethyloxonium hexachloroantimonate are employed, for example, similar results are achieved.

EXAMPLE 18

Instead of employing the 1,3-dioxacycloheptane of Example 13, 5 mol percent of 1,3-dioxolane is employed. The polymerizate, obtained in an 85% yield, exhibits the following properties: $\eta_{red}$: 2.11; thermal stability after 4 hours at 222° C. under nitrogen: 96.6%.

If ethylene oxide or styrene oxide is used in place of 1,3-dioxolane, similar results are obtained.

EXAMPLES 19 to 22

In a test tube (30 x 160 mm.), there are mixed at 70° C. in parallel batches 45 g. trioxane, 0.05 ml. initiator solution, and varying proportions of 1,3-dioxacycloheptane. Ten seconds after clouding is observed, the mixture is immersed into an ice bath for 15 mintues, and then it is heated to 70° C. for 10 minutes. As a comparative example, attention is directed to Example 22, the polymerization being terminated at 70° C. about 2 minutes after clouding without any cooling and heating periods. The comparative results are tabulated in Table III.

TABLE III

| Example | Proportion of comonomer (mol percent) | Initiator Amount (ml.) | Yield (percent) | Thermal stability under $N_2$ at 222° C. (percent) (min.) | | | | η Red |
| --- | --- | --- | --- | --- | --- | --- | --- | --- |
| | | | | 30 | 60 | 120 | 240 | |
| 19 | 1 | 0.05 | 95 | 95.5 | 91.6 | 91.5 | 91.5 | 1.84 |
| 20 | 2.5 | 0.05 | 88 | 99.0 | 96.6 | 95.4 | 94.5 | 1.94 |
| 21 | 5 | 0.05 | 90 | 96.2 | 95.8 | 95.2 | 95.0 | 1.48 |
| 22 | 5 | 0.05 | 92 | 96.8 | 94.2 | 90.0 | 86.6 | 1.01 |

An important advantage of this invention is that the final products exhibit such high thermal stabilities that the previously indispensable process step of removing the unstable chain ends can be eliminated. Of equal importance is that the product yields of this invention are not significantly lowered, if at all. Furthermore, by this invention, it is possible to obtain, with a considerably lower proportion of comonomers, products exhibiting substantially the same stability as are produced by conventional processes employing far higher comonomer proportions. Finally, by the addition of suitable stabilizers to the worked-up polymerizate, products can be obtained which are directly utilizable for shaping operations.

Whereas the quenching step results in a sharp increase in the molecular weight of the polymer, the subsequent tempering step leads to a decrease in the molecular weight, the final molecular weight being thus within a technically practicable range.

Both the quenching and tempering steps function to increase the thermal stability of the polymers.

Although it has been known that the storage of raw polymerizates leads to an improvement in thermal stability, due to hydride migration at the chain ends (H. D.

Hermann, E. Fischer, and K. Weissermel, "Makromolekulare Chem." (Macromolecular Chemistry), 90, 1–11 (1966), this improvement in stability is associated with such a severe decrease in the molecular weight that the thus-obtained products are substantially useless for all practical purposes. If anything, therefore, this prior art would have dissuaded one skilled in the art from storing the polymerizates, and makes the results achieved by this invention all the more unexpected and unobvious.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of thermally stable polyoxymethylenes, which process comprises the steps of:
    (a) bulk copolymerizing trioxane and, based on the total mols of monomers, 0.1–20 molar percent of a member selected from the group consisting of a cyclic ether of 2–10 carbon atoms and 1–2 oxygen atoms and cyclic acetal of 3–11 carbon atoms and 2–3 oxygen atoms, at 62–120° C. in the presence of a catalytic amount of a cationic catalyst until turbidity or strong increase of viscosity is reached, but before termination of the polymerization;
    (b) quenching the resultant polymerizate to −10 to +60° C. inclusive, for 1–240 minutes;
    (c) storing the resultant polymerizate from step (b) for 5–120 minutes at 30–120° C.; and
    (d) then cooling the resultant polymerizate to ambient temperature.

2. A process as defined by claim 1 wherein 80–100% of the copolymerization is completed at −10 to +60° C., inclusive, in step (b).

3. A process as defined by claim 1 wherein said quenching is to 0–40° C.

References Cited

UNITED STATES PATENTS

| | | | |
|---|---|---|---|
| 3,072,609 | 1/1963 | Berardinelli et al. | 260—67 |
| 3,294,750 | 12/1966 | Baccaredda et al. | 260—67 |
| 3,337,507 | 8/1967 | Gutweiler et al. | 260—67 |
| 3,299,003 | 1/1967 | Bader et al. | 260—67 |
| 3,316,217 | 4/1967 | Weissermel et al. | 260—67 |

FOREIGN PATENTS

Vogl, Polyaldehydes, The Polymerization and Copolymerization of Trioxane, p. 34–35, Marcel Dekker, Inc., N.Y. 1967.

WILLIAM SHORT, Primary Examiner

L. M. PHYNES, Assistant Examiner